Dec. 14, 1965 L. L. KORB ETAL 3,223,570

PROCESS OF APPLYING OVERLAY DESIGN TO PRE-CURED RESIN

Filed May 7, 1962

INVENTORS
LOUIS L. KORB
JOSEPH METZNER
BY
Walter J. Monacelli
ATTORNEY

United States Patent Office 3,223,570
Patented Dec. 14, 1965

3,223,570
PROCESS OF APPLYING OVERLAY DESIGN TO PRE-CURED RESIN

Louis L. Korb and Joseph Metzner, Sheboygan, Wis., assignors to Plastics Engineering Company, Sheboygan, Wis., a corporation of Wisconsin Filed May 7, 1962, Ser. No. 192,981
6 Claims. (Cl. 156—298)

This invention relates to a process for applying a sheet or film of uncured resin to a pre-cured or molded resin. More specifically it relates to a process of applying and adhering to a completely cured, pre-formed resin, a film or sheet of uncured resin having a design in metallic ink imprinted thereon.

There are various methods of applying decorative designs, printing, etc. to preformed or molded resinous articles. However, these are cumbersome and expensive in view of the number of operations involved and the type of materials required. Moreover the result and effects are not always satisfactory with respect to the properties obtained.

In one particular field, namely, the manufacture of printed circuits, various complicated steps are required to give satisfactory products. In one method of manufacture, a thermoset resin serving as the supporting base has adhered thereto a thin sheet of metal foil such as copper foil. On this foil is imprinted the design of the desired printed circuit. The design is printed in a resist material, which protects the area of the metal coated thereby against the action of an etchant. By exposing the unprotected areas of the copper foil to this etchant, the undesired areas of the copper foil are eaten away. Then the resist layer is removed by dissolving the resist material, thereby exposing the desired printed circuit design.

In addition to the various cumbersome steps involved, there is a substantial waste of copper which is removed by the etachant and is not recovered. While there are various other methods of manufacturing printed circuits the others also have disadvantages which makes them less attractive and the above described method is the one in general commercial use.

In applying various decorative coatings to preshaped or preformed resin articles, the decorative coating is generally applied to the surface of the article before the resin is cured, in order to obtain satisfactory adhesion. If the decorative design is applied after curing, it is difficult to obtain proper adhesion.

In accordance with the present invention, it has now been found that a film or sheet of uncured thermosetting resin can be imprinted with metallic ink with the desired design, such as a decorative design, printing, printed circuit design, etc., and the imprinted sheet thereafter applied to a preshaped and pre-cured resin and simultaneously adhered and cured by applying heat and pressure on this sheet while it is positioned against the preshaped and pre-cured resin article.

Most surprisingly it has now been found that even though the resin material of the base or molded article has been previously fully cured, the process of this invention is capable of effecting completely satisfactory adhesion of the sheet to this base material. In view of this discovery, it is now possible to completely cure molded articles and allow them to age and to be stored for subsequent use with the only finishing operation being that of applying the imprinted sheet or film. This allows greater flexibility in the manufacture, storage and processing of base materials at considerable saving in cost. Moreover since the type of resin in the base material can be varied considerably from that in the printed sheet, this allows great flexibility in the use of base materials and coating materials.

The arrangement of the printed design, the film of thermosettable resin and the base of substantially fully cured resin are illustrated in the drawings.

Figure 1:
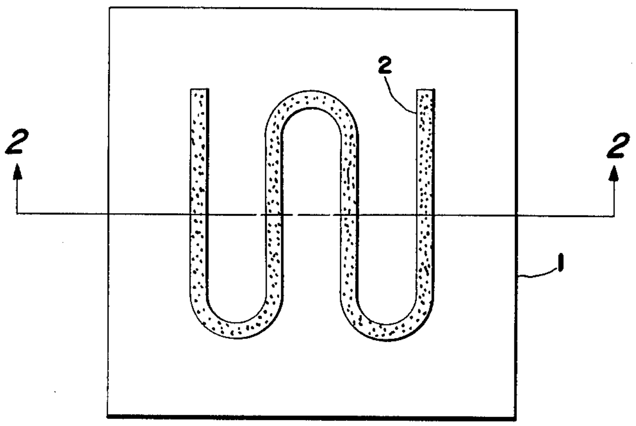
FIG. 1 is a top view of a film having a design imprinted thereon.
Figure 2:
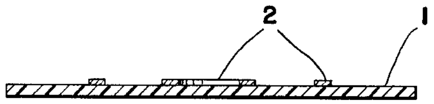
FIG. 2 is a cross-sectional end view of the film and printed design of FIG. 1 taken at line A—A.
Figure 3:
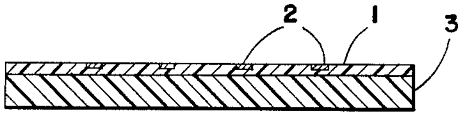
FIG. 3 is a cross-sectional end view of a composite of the film, the printed design and the base of fully cured resin, after the film has been pressed and adhered onto the base. In this view the printed design is on the surface of the film away from the base.
Figure 4:
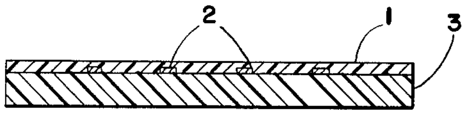
FIG. 4 shows a similar view as in FIG. 3 except that the printed design is on the surface of the film in contact with and adhered to the base.

In the drawings, film 1 of the thermosettable resin has design 2 imprinted thereon. The film is shown in the composite views attached to base 3 comprising a fully cured resin.

In the practice of this invention, various types of plastics or resins can be used in the base supporting material as well as in the uncured resin, preferably thermosetting resins such as various aldehyde condensation resins, such as phenol-aldehyde resins e.g. various phenols, such as phenol resorcinol, naphol, cresol, etc. condensed with various aldehydes such as formaldehyde, various formaldehyde forming or releasing compositions, acetaldehyde, etc., melamine condensation products with various aldehydes, urea-aldehyde condensation products, epoxy resins such as the resins derived from the diglycidyl ethers of bisphenol, resorcinol, dihydroxyldiphenyl, etc., alkyd or polyester resins, such as diallyl and dimethallyl phthalates, ethylene glycol or glyceryl maleate copolymers with styrene, vinyl acetate, etc. The phenol-formaldehyde resins, melamine-formaldehyde, urea-formaldehyde, diglycidyl bisphenol, and diallyl phthalate resins are preferred for use in the base material as well as in the overlay sheets.

While a thin film of the uncured resin may be used as such in the overlay sheet, it is generally preferred to impregnate a sheet of paper, cloth, etc. with a solution or suspension of the resin. The various thermosetting resins listed above are satisfactory for use in an uncured state for preparing the overlay sheets. The paper, cloth, etc., impregnated in making the overlay sheets is advantageously absorbive material, or capable of being impregnated with the uncured resin, and is also capable of withstanding molding temperatures of approximately 380° F. or higher. Cellulose paper, or fiber glass paper, or cloth, such as cotton, linen, etc. can be used for this purpose. The uncured resin can be applied in solution or suspension form by dipping the paper into the solution or suspension until the desired amount of resin is impregnated thereon. Then the paper is withdrawn and the resin allowed to dry by evaporation of the solvent or suspension medium. The desired design can be imprinted on the paper either before impregnation or after drying of the impregnated sheet as described more fully hereinafter.

In addition to the above described method of impregnating a paper, or cloth with the uncured resin, a film of the uncured resin can be prepared by various means used in preparing resin films. For example, a thin layer of the resin solution or suspension can be applied to a smooth surface and the solvent or suspension medium allowed to evaporate. When the film has dried, it can be pulled from the supporting surface and used in a manner similar to that described herein for impregnated papers, etc.

The solvent used in preparing solutions of various uncured resins will vary accordingly to the particular type of resin being used. For example, a mixture of water and alcohol can be used for melamine-formaldehyde resins. Ethyl alcohol can be used for phenol-formaldehyde resins. Alcohol or alcohol-acetone mixtures can be used for diallyl phthalate resins. However, any suitable solvent can be used for this purpose, so long as it gives a sufficient concentration of resin, and is low boiling enough to vaporize rapidly in the drying of the sheet or film. Although various water emulsions of these resins can be used, it is generally preferred to use solutions.

Metallic inks are preferred for the purpose of this invention for various reasons. Such inks are more resistant to the conditions used in curing the resin, and in the manufacture of printed circuits, it is necessary that the resultant design be conductive. Where the design is to be a printed circuit, the metal in the metallic ink is desirably a good conductor of electricity, preferably copper, silver, aluminum, etc. Such conductive inks are commercially available. These comprise a suspended metal powder, a resin binder capable of hardening and binding the metal to the supporting surface, and a solvent or thinner for the binder. Resin binders such as used in ordinary printing inks are suitable for this purpose, including drying oils, unsaturated alkyd resins, etc. These are generally air-dried but can be dried fast by moderately increasing the temperature provided a temperature is not reached which will cure the resin in the supporting sheet or film.

A preferred method of applying the ink to the uncured resin sheet or film, is by silk screening. This is a common well-known method of reproducing designs. The use of a silk screen for imprinting the design is desirable since it permits the application of a considerable thickness of ink, so that when the ink is dry, a sufficient amount of metal has been deposited for conductive purposes. However, other methods can also be used. For example, a printing plate can be used to imprint the desired design. In such cases where the resultant print is not of the desired thickness, the sheet can be immersed in an electroplating bath after electrical conductors have been clipped to appropriate portions of the design. Then the design is plated until a desired thickness of metal is built up on the original design. Instead of using an electroplating system, solution plating can be used effectively and thereby avoid the necessity for making the electrical connections. Solutions for solution plating with various metals are described in the literature. In curing and simultaneously adhering the plastic sheet or film to the base resin material, the temperatures are preferably 280–380° F. However, temperatures as low as 230° F. can be used with longer molding periods, and temperatures as high as 430° F. can be used with some small degradation of the paper when an impregnated paper is used. In this adhering operation, the base material can be initially either at room temperature or at a higher temperature.

Pressures in the range of 500 to 3000 p.s.i. are preferably used with the melamine, phenolic, urea and phthalate type of resins indicated above. With epoxy resins, pressures as low as 50 p.s.i. can be used.

There are no particular requirements as to the type of pressing equipment used provided it is able to effect the required pressure uniformly throughout the contact area between the film and the base material. Generally an air or hydraulic cylinder is used to press the film against the molded piece with a support on the back side of the molded piece so as to avoid any uneven strain or shear on the molded article. This is effected advantageously with a holding fixture having a supporting surface corresponding to the contour of the back of the molded article.

Where it is desired to have the decorative design or the printed circuit embedded in the resultant product, the film or sheet can be placed on the base material with the printing ink area in contact with the base piece. Obviously in such case the original imprint will be made as the mirror image of the desired design so it will appear correctly in its ultimate position. Then as the resin in the film is cured, it will serve as a protective coating over this printed design. Where it is desired to have the design on the outside of the finished article, the film or sheet is positioned in such a manner that the printed design is on the opposite side of the film from that which is in direct contact with the base piece. It is also possible to cure a plurality of such sheets or films so that a number of designs or printed circuits can be superimposed. In this case it is possible to cure and adhere simultaneously two or three such sheets with satisfactory results. However, when a greater number of sheets are to be superimposed, it is generally preferred to perform such operation in a number of steps curing two or three such sheets at a time and adding additional sheets incrementally until the desired number of sheets have been superimposed and cured.

The overlay sheet can be adhered to any portion of the base or molded article which has a flat or cylindrical surface. The cylinder surface can be concave or convex and the corresponding area of the press is modified accordingly to give uniform pressure against the overlay sheet.

One advantage of this invention is that holes can be punched or drilled into the pre-cured base material for proper registration of printed circuits to be superimposed thereon. This is not possible in a base material which is not pre-cured, but is cured simultaneously with adhesion of the superimposed sheet. This pre-curing and pre-punching of positioning holes in the base piece permits greater accuracy in positioning and registration of superimposed printed circuits. Moreover, another advantage of this invention is the fact that holes can be punched in various overlay sheets corresponding to the position of the holes in the base material, so that the design which is printed on each sheet, either before or after the holes are punched, is surer to be in proper registration with the base support, and with other sheets when there are a plurality of such printed sheets. Furthermore, when the holes are punched prior to application of a conductive printing ink, the inside of these holes can be coated with printing ink to improve the contact of the conductive areas of the printed circuit with the connecting pins which are inserted in the openings.

Connecting pins can actually be inserted prior to the pressing and adhering step provided the pins are short enough so as not to interfere with the pressing operation. In some cases a cylindrical pin or sleeve can be used having an outside diameter corresponding to the diameter of the opening, and after the pressing operation a longer pin can be inserted in the interior of the cylinder and the ends of the pins bent over to provide a tight contact. Eylets can also be used to insure tight fit and better contact with the conductive surface of the printed circuit. It is also possible by the practice of this invention to place printed circuit designs on both sides of the same sheet of plastic film. It is also possible to provide built-in resistors by using a different type of ink in certain areas of a printed circuit. For example, where desired, a resistor can be formed by depositing a metal of lower conductance and appropriate cross-section to give the desired resistance in the appropriate regions. It is also possible to punch the paper in a contact area into an opening in the base material so that the paper overlaps into the opening and provides a greater contact area of the printed circuit.

The methods of practicing the invention are illustrated by the following examples. These examples are intended merely to illustrate the invention and not in any way to limit the scope of the invention nor the manner in which the invention can be practiced. Parts and percentages recited therein and throughout the specification, unless specifically provided otherwise, are by weight.

*Example I*

A sheet of paper (cellulose) 12" x 12" is dipped into a 50% solution of melamine-formaldehyde having a specific gravity of 1.182 at 25° C. and a viscosity of 32 centipoises, until the paper is saturated therewith. The melamine-formaldehyde resin is prepared as follows: To 2580 grams of 36% formaldehyde are added 15.4 ml. of 10% sodium hydroxide to secure a pH at 25° C. of 9.05 to 9.15. To this added 1300 grams of melamine and the mixture heated under brisk agitation to 80° C. in about 25 minutes, at which time the pH of a sample at 25° C. is found to be in the range 9.95 to 10.05. Distillation is immediately started at a vacuum of 18 inches of mercury to maintain a distillation temperature of 80° C. Distillation is continued, keeping the batch temperature at 80° C. and increasing the vacuum as necessary until a sample of the resin, cooled to room temperature, is found to be capable of being readily pulverized with a mortar and pestle. At this time the resin is discharged and allowed to cool in a layer about 1.5 inches thick. The resin solution is prepared by dissolving the coarse-crashed resin in its own weight of a mixture of 90% distilled water and 10% of denatured ethyl alcohol at room temperature.

The impregnated paper is hung by clips and allowed to dry by evaporation of the solvent. After the impregnated paper has dried, it is cut into four pieces, 6" x 6" each. On one of these pieces a printed circuit design is imprinted by means of a silk screen on which the desired design has been produced. A liberal coating of conductive silver metal ink is applied to the open areas of the silk screen so as to give a heavy coating in the desired areas. The ink is allowed to air dry for 24 hours and the imprinted sheet is placed on a flat piece of fully cured epoxy resin approximately one-eighth inch thick and thus placed in a press in which the back support on which the epoxy resin rests is a flat surface. The surface bearing on the impregnated printed paper sheet which is superimposed on the epoxy back also has a flat surface. The portion of the press in contact with the printed, impregnated sheet has previously been heated to a temperature of 380° F. and a hydraulic pressure of 1000 p.s.i. is applied for 15 seconds. After the pressure is released and the product allowed to cool, it is found that the impregnated sheet has been fully cured and is well bonded to the epoxy backing.

Another of the 6" x 6" impregnated sheets is then similarly imprinted using a conductive copper metal ink and the processing repeated. In this case excellent curing and the bonding are also obtained. The two remaining sheets are similarly processed using conductive aluminum ink and conductive bronze ink respectively. In each case similar results are obtained.

The resultant printed circuits are tested by making electrical contacts with different portions of the printed circuits, so that various areas serve as part of electrical circuits. They are found to perform most satisfactorily for this purpose.

*Example II*

The procedure of Example I is repeated with similar satisfactory results using as the impregnating resin solution a phenol-formaldehyde resin of 50% concentration of ethyl alcohol. The phenol-formaldehyde resin is prepared by reacting a weight ratio of 100 parts of natural phenol (10% o-cresol), 90 parts of 37% formaldehyde, and 2 parts of hexamethylenetretramine at atmospheric pressure with reflux for 1 hour, dehydrating at 26 inches of mercury vacuum to a resin temperature of 100° C., and then dissolving the resin by adding to the reaction kettle 90 parts of denatured ethyl alcohol. Additional alcohol is added as needed to adjust the resin content of the solution to 50% as determined by heating a 1 to 1.5 gram sample of the liquid in an aluminum weighing dish for 3 hours in an oven at 135° C.

*Example III*

The procedure of Example I is repeated using as the impregnating resin a urea-formaldehyde resin dissolved in methyl alcohol in 50% concentration with a solution viscosity of 35 centipoises. Similar results are obtained.

*Example IV*

The procedure of Example I is repeated using as the impregnating resin a 50% solution of diallyl phthalate resin in equal parts of alcohol and acetone, having a solution viscosity of 42 centipoises. In this case the imprinted design is a decorative one and the pre-cured resin in the base support is a phenol-formaldehyde resin. Similar results are obtained.

*Example V*

The procedure of Example I is repeated using as the impregnating resin a 50% toluene solution of a diglycidyl ether of bisphenol polymer of a viscosity of 130 poises and using as the base support material a fully cured melamine-formaldehyde resin. Similar results are obtained.

*Example VI*

The procedure of Example I is repeated except that, instead of a silk screen, a zinc printing plate on which the desired printed circuit design has been etched is used to make the imprint with silver, copper, and aluminum conductive printing inks respectively. After the ink is dried a wire is clipped to each imdependent area of the printed circuit design, and the dry paper is, in each case, placed in an electro plating bath containing 27 ounces of copper sulfate per gallon, sulfuric acid 6.5 ounces per gallon, a temperature of 75–130° F. is used, a current density of 15–40 amperes per square foot and a voltage of 0.75–2 volts. The printed circuit is made the depositing electrode and connected in the electrical plating circuit so that the printed area of the printed circuit design is plated to a thickness approximately four times that originally deposited by the printing plate. Upon testing, these circuits are found to be excellent conductors.

*Example VII*

The procedure of Example I is repeated using in place of the paper, rag cloth, linen cloth, and a fiber glass cloth, in each case satisfactory results are obtained.

*Example VIII*

Using the procedure of Example I, four printed circuits are made using a conductive copper printing ink, the individual circuits being designed so that they may be superimposed and registered so as to have connecting areas desirably located on the different sheets. Registration holes are punched in the base material and likewise in the respective sheets. Two sheets are positioned on the base and simultaneously cured and adhered for thirty seconds instead of fifteen seconds. Then pressure is released and the two remaining sheets positioned and likewise simultaneously cured and adhered. On insertion of connecting pins in the appropriate openings, and testing with electrical current, satisfactory operation of the printed circuits is obtained.

*Example IX*

An overlay sheet having a copper printed design on both sides of the sheet is made in accordance with the procedure of Example I. After simultaneously curing and adhering the sheet to the base material as in Example I, excellent boding is effected and satisfactory electrical conductance results.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. A process for bonding an overlay sheet having a conductive metallic design printed thereon to a substantially fully cured resin material comprising the steps of imprinting a design in a conductive metal ink on a sheet of uncured thermosettable resin, drying said imprinted design, and thereafter bonding said imprinted sheet to a substantially fully cured resin molded article by applying pressure in the range of 500–3000 p.s.i. at a temperature in the range of 280°–380° F. for at least 15 seconds to fully cure the resin in said sheet while said sheet is in intimate contact and pressed against said molded article said substantially fully cured resin material and said uncured thermosettable resin each being selected from the class consisting of phenolic-aldehyde resins, melamine-aldehyde resins, urea-aldehyde resins, diglycidyl ether resins of bisphenol, resorcinol and dihydroxydiphenyl, diallyl and dimethallyl phthalate resins, and ethylene glycol and glyceryl maleate copolymers of styrene and of vinyl acetate.

2. The process of claim 1 in which said sheet comprises a sheet of porous material impregnated with said uncured thermosettable resin.

3. A process of claim 2 in which said porous material is cloth.

4. A process of claim 2 in which said porous material is paper.

5. A process of claim 1 in which both of said resinous materials are selected from the class consisting of melamine-formaldehyde, phenol-formaldehyde, melamine-phenol-formaldehyde, urea-formaldehyde, diallyl phthalate, and diglycidyl bisphenol resins.

6. A process of claim 5 in which said steps are repeated at least once so as to superimpose a plurality of said imprinted sheets and thereby adhere said sheets to each other and to said molded article.

References Cited by the Examiner

UNITED STATES PATENTS

| | | | |
|---|---|---|---|
| 2,026,105 | 12/1935 | Stresino | 156—224 |
| 2,276,567 | 3/1942 | Donaldson | 156—224 |
| 2,801,198 | 7/1957 | Morris et al. | 161—264 XR |
| 2,833,685 | 5/1958 | Lawrence | 156—277 XR |
| 2,857,302 | 10/1958 | Burton et al. | 161—264 XR |
| 3,067,077 | 12/1962 | Latella et al. | 161—413 XR |

EARL M. BERGERT, *Primary Examiner.*